United States Patent [19]

Sato

[11] Patent Number: 5,261,062
[45] Date of Patent: Nov. 9, 1993

[54] REGISTER ALLOCATION SYSTEM ADAPTIVE FOR PIPELINING

[75] Inventor: Yoshikazu Sato, Tokyo, Japan

[73] Assignee: Oki Electric Industry Co., Ltd., Tokyo, Japan

[21] Appl. No.: 607,062

[22] Filed: Oct. 31, 1990

[30] Foreign Application Priority Data

Nov. 8, 1989 [JP] Japan .................................. 1-288702

[51] Int. Cl.⁵ ............................................. G06F 12/00
[52] U.S. Cl. .................................... 395/375; 395/700; 395/425; 364/231.8; 364/246; 364/280.4; 364/DIG. 1
[58] Field of Search ................ 395/375, 400, 700, 425

[56] References Cited

U.S. PATENT DOCUMENTS

| | | | |
|---|---|---|---|
| 4,435,753 | 3/1984 | Rizzi | 395/700 |
| 4,571,678 | 2/1986 | Chaitin | 395/700 |
| 4,754,394 | 6/1988 | Brantley, Jr. et al. | 395/400 |
| 4,782,444 | 11/1988 | Munshi et al. | 395/700 |
| 4,891,753 | 1/1990 | Budde et al. | 395/375 |
| 4,903,196 | 2/1990 | Pomerene et al. | 395/375 |

Primary Examiner—Robert B. Harrell
Assistant Examiner—Alpesh M. Shah
Attorney, Agent, or Firm—Spencer, Frank & Schneider

[57] ABSTRACT

A computer implemented register allocation for use in preprocessing a program for a system using pipelining, in which real registers are allocated to instructions included in the program, after the allocation of registers, relocation of the plurality of instructions is performed, the plurality of instructions being subsequently executed in parallel to perform an arithmetic operation processing. The register allocation includes determining a number of interferences, which indicates the number of registers simultaneously used by the instructions during the arithmetic operation processing, determining whether the number of interferences exceeds the total number of registers, and if the number of interferences does not exceed the total number of registers, then allocating the instructions to the registers.

3 Claims, 9 Drawing Sheets

Fig. 1A

MACHINE WORDS

| | | | |
|---|---|---|---|
| LOAD | $r_0$, b | ---- | (11) |
| STORE | $r_0$, a | ---- | (12) |
| LOAD | $r_1$, d | ---- | (13) |
| STORE | $r_1$, c | ---- | (14) |
| LOAD | $r_2$, f | ---- | (15) |
| STORE | $r_2$, e | ---- | (16) |

Fig. 1B

MACHINE WORDS

| | | | |
|---|---|---|---|
| LOAD | $r_0$, b | ---- | (11) |
| LOAD | $r_1$, d | ---- | (13) |
| LOAD | $r_2$, f | ---- | (15) |
| STORE | $r_0$, a | ---- | (12) |
| STORE | $r_1$, c | ---- | (14) |
| STORE | $r_2$, e | ---- | (16) |

Fig. 2A
PRIOR ART

SOURCE PROGRAM a = b ;

PSEUDO-CODES

| | | | |
|---|---|---|---|
| LOAD | VR1, b | --- | (1) |
| STORE | VR1, a | --- | (2) |
| LOAD | VR2, d | --- | (3) |
| STORE | VR2, c | --- | (4) |
| LOAD | VR3, f | --- | (5) |
| STORE | VR3, e | --- | (6) |

Fig. 2C
PRIOR ART

MACHINE WORDS

| | | | |
|---|---|---|---|
| LOAD | $r_0$, b | ---- | (1) |
| STORE | $r_0$, a | ---- | (2) |
| LOAD | $r_0$, d | ---- | (3) |
| STORE | $r_0$, c | ---- | (4) |
| LOAD | $r_0$, f | ---- | (5) |
| STORE | $r_0$, e | ---- | (6) |

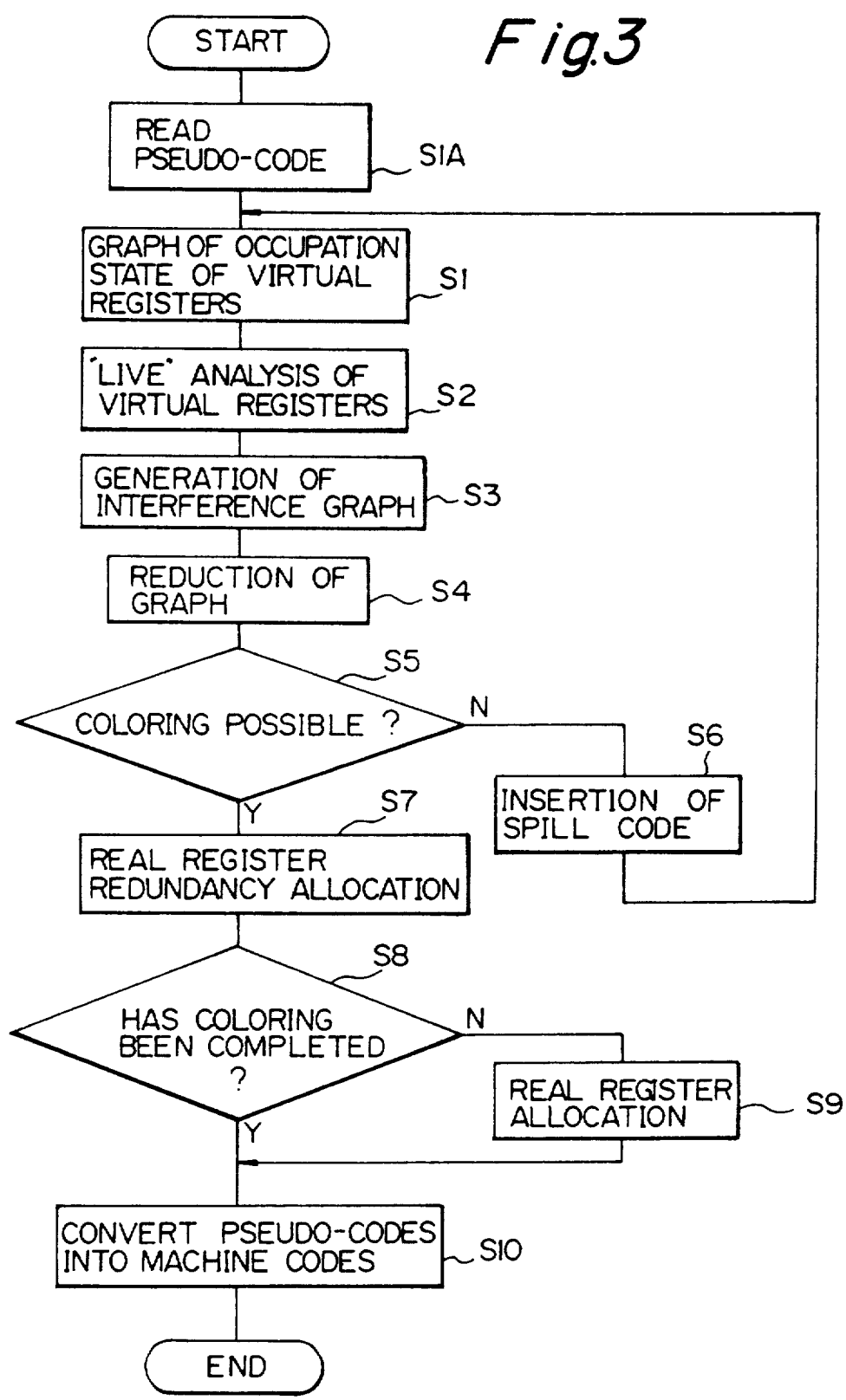

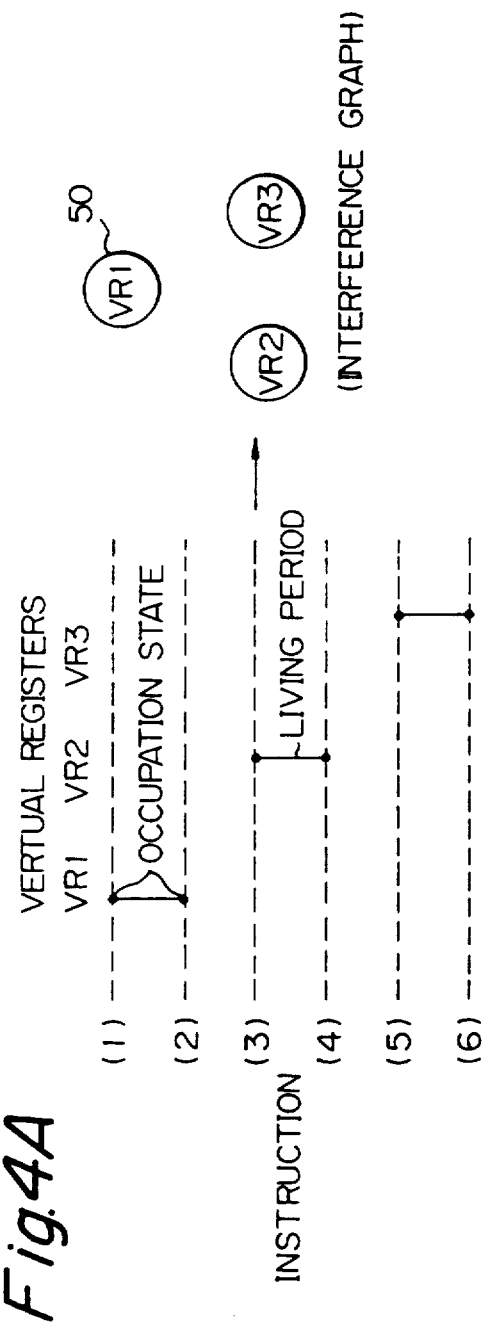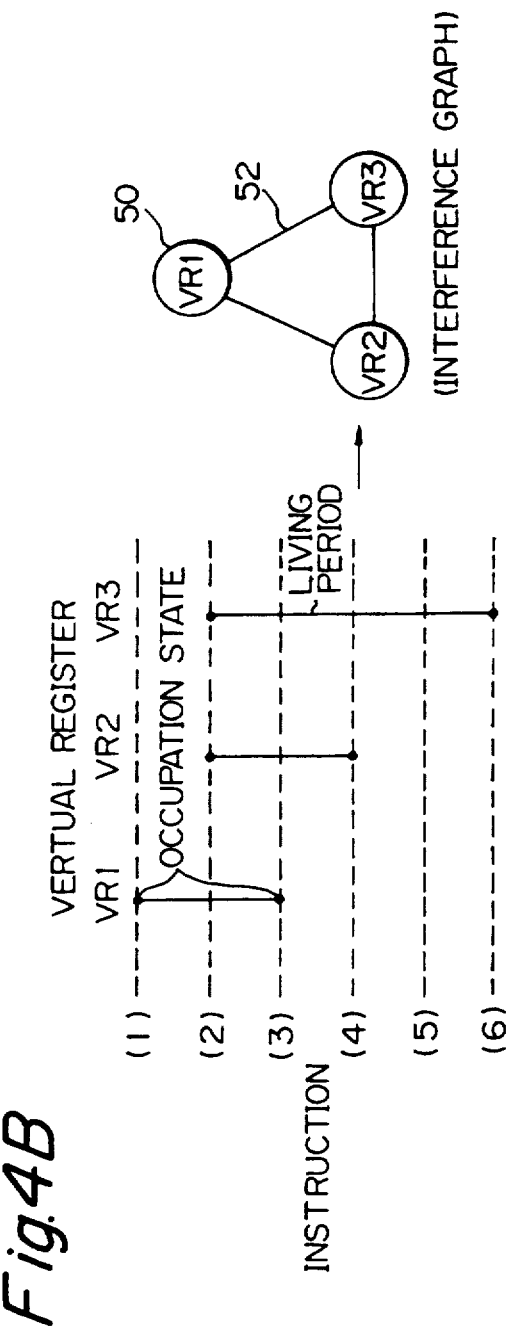

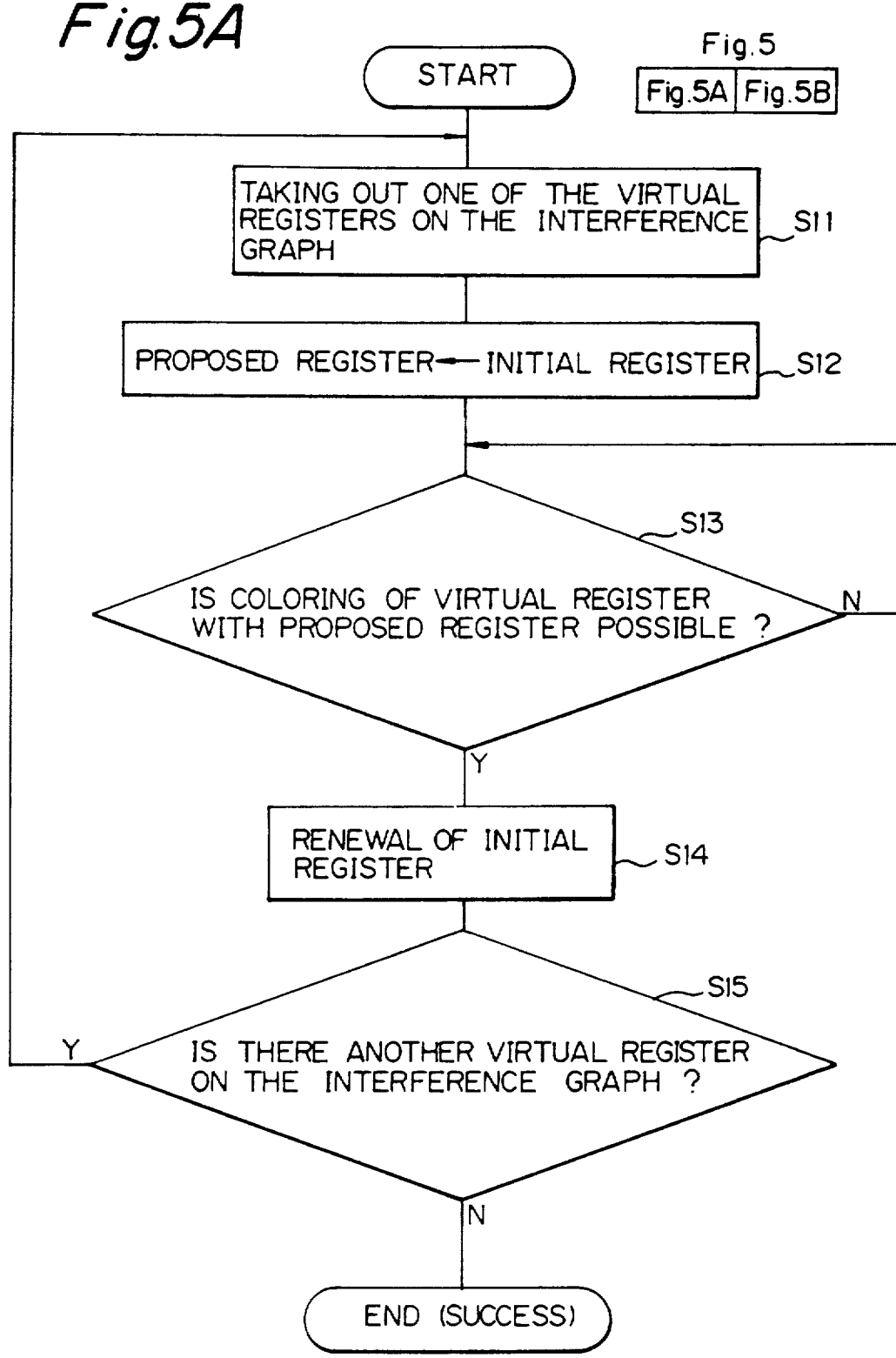

Fig.7

| REAL REGISTER | THE USE FOR PURPOSES | REMARKS |
|---|---|---|
| $r_0$ ) $r_3$ | • TRANSFER OF PARAMETERS<br>• FUNCTION RETURN VALUE | NO SECURITY OF VALUES BETWEEN FUNCTIONS |
| $r_4$ ) $r_{15}$ | • REGISTERS FOR VARIABLE | SECURITY OF VALUES BETWEEN FUNCTIONS |
| $r_{16}$ ) $r_{28}$ | • REGISTERS FOR OPERATION | NO SECURITY OF VALUES BETWEEN FUNCTIONS |
| $r_{29}$ ) $r_{31}$ | • SPECIFIC REGISTERS | FRAME POINTER, STACK POINTER, ETC. |

REGISTER ALLOCATION SYSTEM ADAPTIVE FOR PIPELINING

BACKGROUND OF THE INVENTION

1. Field of the Invention

The present invention relates to a register allocation system adaptive for pipelining wherein each register is allocated to an associated instruction in a compiler which compiles or translates a program written in a high-order language for programming to output a sequence of machine-oriented words adaptive for pipelining.

2. Description of the Prior Art

The compiler is utilized in order to obtain an executable machine-language program, or an executable format of a program, upon translation of a source program written in a high-order language for programming.

In the compiler, there is provided processing such that the source program is temporarily compiled into an intermediate format program, and then the intermediate format program is further translated into an executable format program.

The intermediate format program comprises pseudo-codes. The pseudo-codes are virtual machine-oriented instructions which are not limited in the number of registers used. A register, which is used to store an operand of an instruction represented by such a pseudo-code, is called a virtual register.

In a case where the intermediate format program is compiled into the executable format program, it is necessary to perform a register allocation processing in which the virtual registers are alloted to real registers which actually exist. This register allocation processing is provided as a sort of back end processing of the compiler, which is a compiler processing from the intermediate format program into the executable format program.

In the register allocation processing, it is desirable to proceed with the processing in such a way that the number of real registers to be used is reduced as much as possible, since the real registers are limited in number.

In the recent CPU (processor) design, pipeline control is performed to increase processing speed. The pipeline control provides control whereby one instruction is divided into a plurality of steps, and during execution of some step of the instruction, some step of another instruction is executed. According to this control, it is possible to execute a plurality of instructions during a unit period of time which formerly permitted, only one instruction to be executed, and thus to increase a processing speed as the whole.

When an execution result of some instruction is used by another instruction, there is occasionally a case where execution of a succeeding instruction is paused until execution of the preceding instruction is completed. These instructions cannot be processed on a parallel basis as in pipeline control, and such an event is called a disturbance of the pipe.

In order to reduce such disturbances of the pipe as little as possible, the compiler performs a so-called optimizing processing of instruction relocation adaptive for pipelining in which the sequence of instructions in the executable format of a program is changed.

According to the conventional compiler, a register allocation processing is performed independently of the optimizing processing of instruction relocation adaptive for pipelining (hereinafter simply referred to as optimizing processing), without having any relationship therebetween.

FIGS. 2A, 2B and 2C are diagrams for explaining the operation of the conventional compiler. Now assuming that a source program as shown in FIG. 2A is compiled into pseudo-codes as shown in FIG. 2B, in pseudo-code (1), the value of "b" is loaded in virtual register VR1. In pseudo-code (2), the value of virtual register VR1 is stored in "a". The pseudo-codes (3)-(6) are likewise produced.

If there is provided register allocation processing such that real registers are alloted to the pseudo-codes as mentioned above, an executable format of program of the machine-oriented language as shown in FIG. 2C is produced. That is, in machine-oriented instruction (1), the value of "b" is loaded in real register r0. In machine-oriented instruction (2), the value of real register r0 is stored in "a". The machine words (3)-(6) are likewise produced.

There is provided, between the machine-oriented words, a relationship such that after completion of execution of the machine language instruction (1), it only permits execution of the machine language instruction (2), after completion of execution of the machine language instruction (3), it only permits the machine language instruction (4) to be executed, and after completion of execution of the machine instruction (5), it only permits execution of the machine-language instruction (6). In other words, after execution of the machine instructions (2) and (4), the values of the real register r0 become unnecessary, respectively. Thus, in the register allocation processing, it is possible to allocate the real register r0 to all of the machine words, so that the real register r0 is most efficiently used.

By the way, in a case there is provided an optimizing for the machine instructions as shown in FIG. 2C, there is not such an occasion that the machine instructions are relocated. The reason is that the real register r0 is allocated to all of the machine or instructions, and thus the execution cannot be performed on a parallel basis. Therefore, the conventional compiler encounters such a problem that disturbances of the pipe, which would occur between each couple of the machine words (1)-(2), (3)-(4) and (5)-(8), cannot be resolved.

SUMMARY OF THE INVENTION

In view of the foregoing, the present invention has been made. It is therefore an object of the present invention to provide a register allocation system adaptive for pipelining capable of improving the optimizing of instruction relocation adaptive for pipelining and thus reducing disturbances of the pipe.

In accordance with the present invention, there is disclosed a register allocation method adaptive for a pipelining system in which after allocation of registers to be used for a plurality of instructions included in a program, relocation of said plurality of instructions can be performed, and the plurality of instructions can be executed in parallel to perform arithmetic operation processing, wherein the registers are allocated to the plurality of instructions to be executed on a parallel basis in such a manner that respective ones of the instructions are provided with associated ones of the registers, if the number of interferences, which indicates the number of registers to be simultaneously used by the plurality of instructions at a predetermined timing during the arithmetic operation processing, does not exceed the total number of the registers.

In accordance with one aspect of the present invention, the number of interferences, which indicates the number of registers to be simultaneously used by the plurality of instructions at a predetermined timing during the arithmetic operation processing, is retrieved, and as a result, if it is equal to or less than the total number of said registers, the registers are allocated to the instructions to be executed on a parallel basis in such a manner that each individual one of the instructions is provided with the associated one of the registers. This feature makes it possible, even if a plurality of instructions are simultaneously executed, to avoid occupation of the register on an overlap basis, thereby reducing the disturbances of the pipe.

BRIEF DESCRIPTION OF THE DRAWINGS

The objects and features of the present invention will become more apparent from the consideration of the following detailed description taken in conjunction with the accompanying drawings in which:

FIGS. 1A and 1B are diagrams used for the explanation of the operation of the compiler according to the present invention;

FIGS. 2A, 2B and 2C are diagrams used for the explanation of the operation of the conventional compiler;

FIG. 3 is a flow chart which shows an operation of the system according to the present invention;

FIGS. 4A and 4B are charts showing the occupation state of the virtual resisters included in the pseudocodes in an embodiment of the present invention;

FIGS. 5A and 5B, when combined as shown in FIG. 5, show a detailed flow of a real register redundancy allocation in the embodiment;

FIG. 7 is a diagram used for the explanation of an arrangement of the real registers in the embodiment;

DESCRIPTION OF THE PREFERRED EMBODIMENT

FIGS. 1A and 1B are diagrams used for the explanation of the operation of the compiler according to the present invention. In FIGS. 1A and 1B, there are shown the executable format of programs written in a machine language before and after the optimizing processing of instruction relocation adaptive for pipelining (optimizing processing). The source program and the intermediate format of program including pseudo-codes may be the same as ones described with references to FIGS. 2A and 2B, respectively.

According to a register allocation system adaptive for pipelining of the present invention, as shown in FIG. 1A, three real registers r0, r1 and r2 are allocated to the virtual registers. More specifically, the real register r0 is allocated to the machine-oriented words (11)–(12). Similarly, the real registers r1 and r2 are allocated to the machine language words (13)–(14) and (15)–(16), respectively. Provided the optimizing processing is performed under the conditions as mentioned above, as shown in FIG. 1A, the machine words (11)–(13)–(15) and the machine words (12)–(14)–(16) are relocated in the order named, thereby preventing the disturbances of the pipe.

Figure 8:
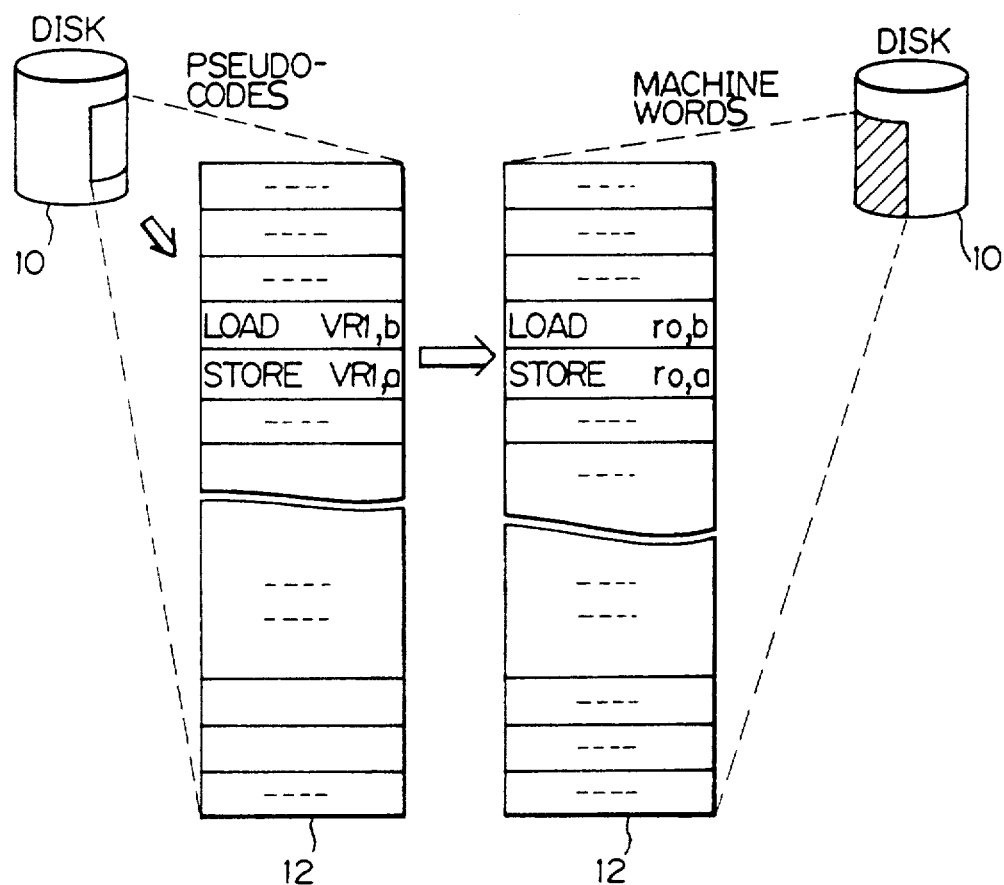
FIG. 8 schematically shows an example of the procedure performed in part of the flow shown in FIG. 3.

Now referring to FIG. 3 of the drawings and thereafter, a preferred embodiment of the register allocation system adaptive for pipelining of the present invention will be described more in detail. FIG. 3 is a flow chart which shows an operation of the system by a central processor unit (CPU) 14, FIG. 9, according to the present invention. FIGS. 4A and 4B are diagrams used for the explanation of the operation related to the present invention, and show the occupation state of the virtual resisters included in the pseudo-codes or an instruction. In FIG. 8, an embodiment of the processing system for the optimizing processing of instruction relocation adaptive for pipelining in accordance with the present invention is schematically illustrated.

In FIG. 3, in a case where a register allocation processing is performed, each of the pseudo-codes of which the intermediate format of program is composed is read out form a data file such as a disk 10 and in turn loaded to a working area of a temporary memory 12 (step S1A) to graph the occupation state of the virtual resisters (step S1). More specifically, there is performed on each virtual resister a graph, represented by dots in FIGS. 4A and 4B, of the pseudo-code giving the definition of a LOAD instruction, etc., and the occupation of state of a STORE instruction, etc., of the virtual resister.

In step S2, LIVE analysis of the virtual resisters is performed. Specifically, there is performed a graph, represented by solid lines in FIGS. 4A and 4B, of a living period, which continues from when the virtual register is defined and while occupied, of each of the virtual resisters. In step S3, an interference graph is made. If the living period of each of the virtual registers overlaps with that of another virtual register, it is called an interference, and if not overlapping, it is called non-interference. The virtual registers or nodes 50, which interfere with each other, are interconnected through edges. FIG. 4A shows a case there is no interference, while FIG. 4B shows a case there is an interference. More specifically, the vitual register VR1 interferes with the viture registers VR2 and VR3, the viture register VR2 interferes with the virtual registers VR1 and VR3, and the virtual register VR3 interferes with the virtual registers VR1 and VR2. Thus, the respective nodes 50 are connected with each other through the edges 52.

In step S4, reduction of the interference graph is performed. It is here assumed that the total number of real registers is a natural number N. In the reduction of the interference graph, there is provided such a processing that if the number of edges 52 extending from a node 50 is less than N, such a node 50 and the associated edges 52 are removed from the interference graph. This processing is repeated until there is no node 50 having edges 52 the number of which is less than N.

If the interference graph becomes empty after processed in the step S4, it is possible to perform coloring of the respective nodes 50 into N colors. Thus, a result of step S5 becomes YES. As a result of step S4, if any node 50 remains, it is impossible to perform "coloring" of the nodes 50 into N colors, so that a result of step S5 becomes NO and the procedure goes to step S6. In step S6, there is performed a processing for insertion of a spill code. In this insertion processing, the spill code, that is, the content of the virtual register is saved into a memory such as storage 12, FIG. 8, and an instruction to return is inserted between the instructions. This insertion processing is intended to reduce the living period of the virtual resister.

If a result of step S5 is YES, there is provided such an allocation (real register redundancy allocation) processing in which the real register is actually allocated to the virtual register in the pseudo-codes (step S7). The processing of step S7 will be described with reference to FIGS. 5A and 5B, which show a detailed flow of a real register redundancy allocation.

Figure 9:
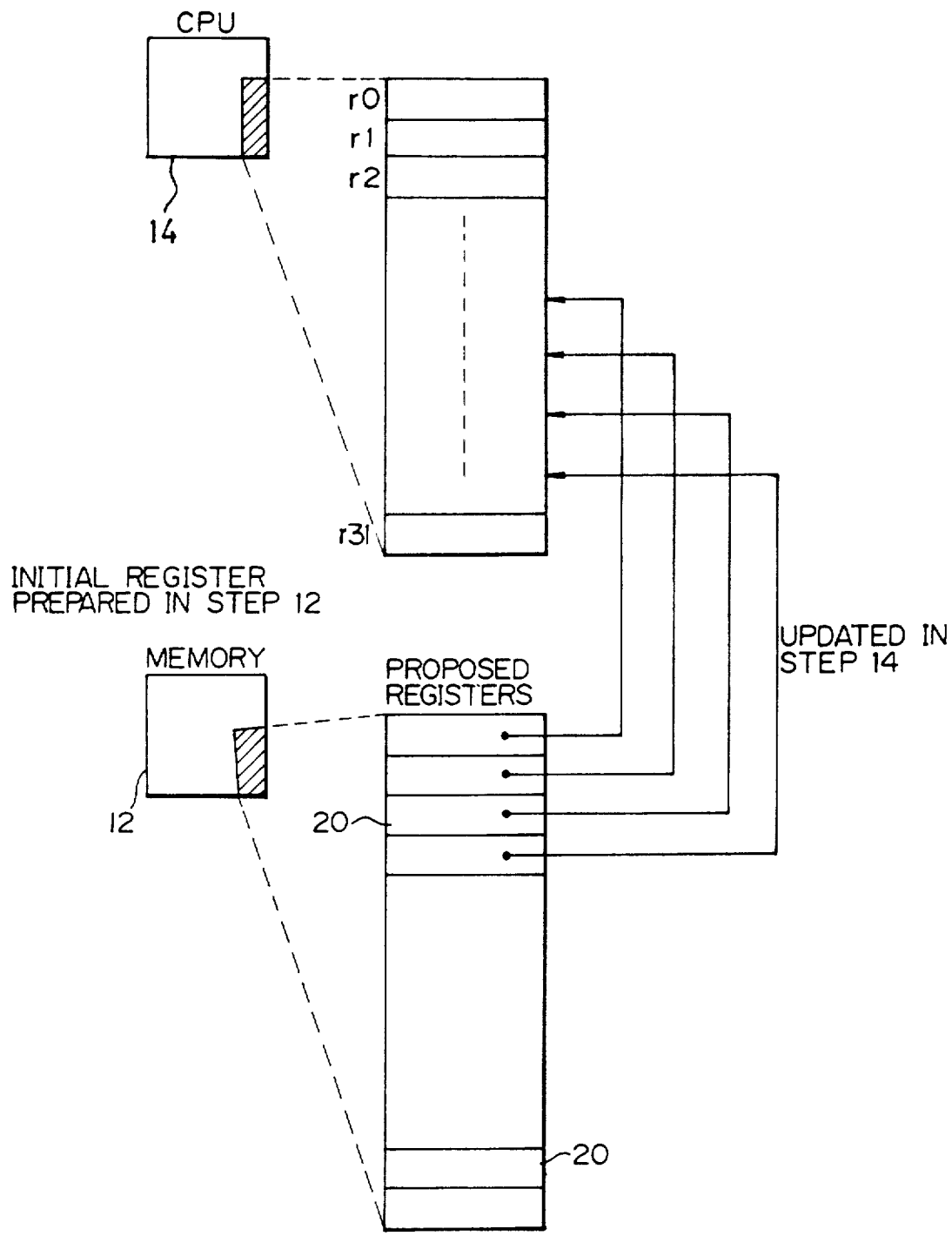
FIG. 9 also schematically shows an example of the procedure performed in another part of the flow shown in FIG. 3.

First, one of the virtual registers on the interference graph is taken out (step S11). Next, in step S12, an initial register, which may be any one of the real registers prepared for allocation, is prepared as a real register proposed for allocation, which will hereinafter be referred to as a proposed register. As understood from FIG. 9, the proposed registers 20 are prepared in memory 12. It is determined whether the virtual register, which has been taken out in step S11, can be colored with the proposed register (step S13). It is possible to perform such coloring, if the color of another virtual register connected to the earlier-mentioned virtual register with the edge is different from the color of the proposed register. If the coloring, or allocation of the real register, is possible, then allocation of such a real register is performed by CPU 14 in step S14 to renew or update the initial register to another real register proposed for allocation, as schematically shown in FIG. 9. Next, determination is made as to whether there is another virtual register to be subjected to allocation of the real register on the interference graph (step S15). If the result is NO, the allocation processing is terminated, and if it is YES, the procedure returns to step S11.

If the result of step S13 is NO, it is discriminated whether there is another proposed real register (step S18). If the result shows YES, the proposed register is renewed to set the other real register (step S17), and the procedure returns to step S13. If the result of step S16 is NO, the processing is terminated as a failure in allocation. In accordance with the procedure as explained above, the processing for allocation of the real registers has been performed.

Figure 5B:
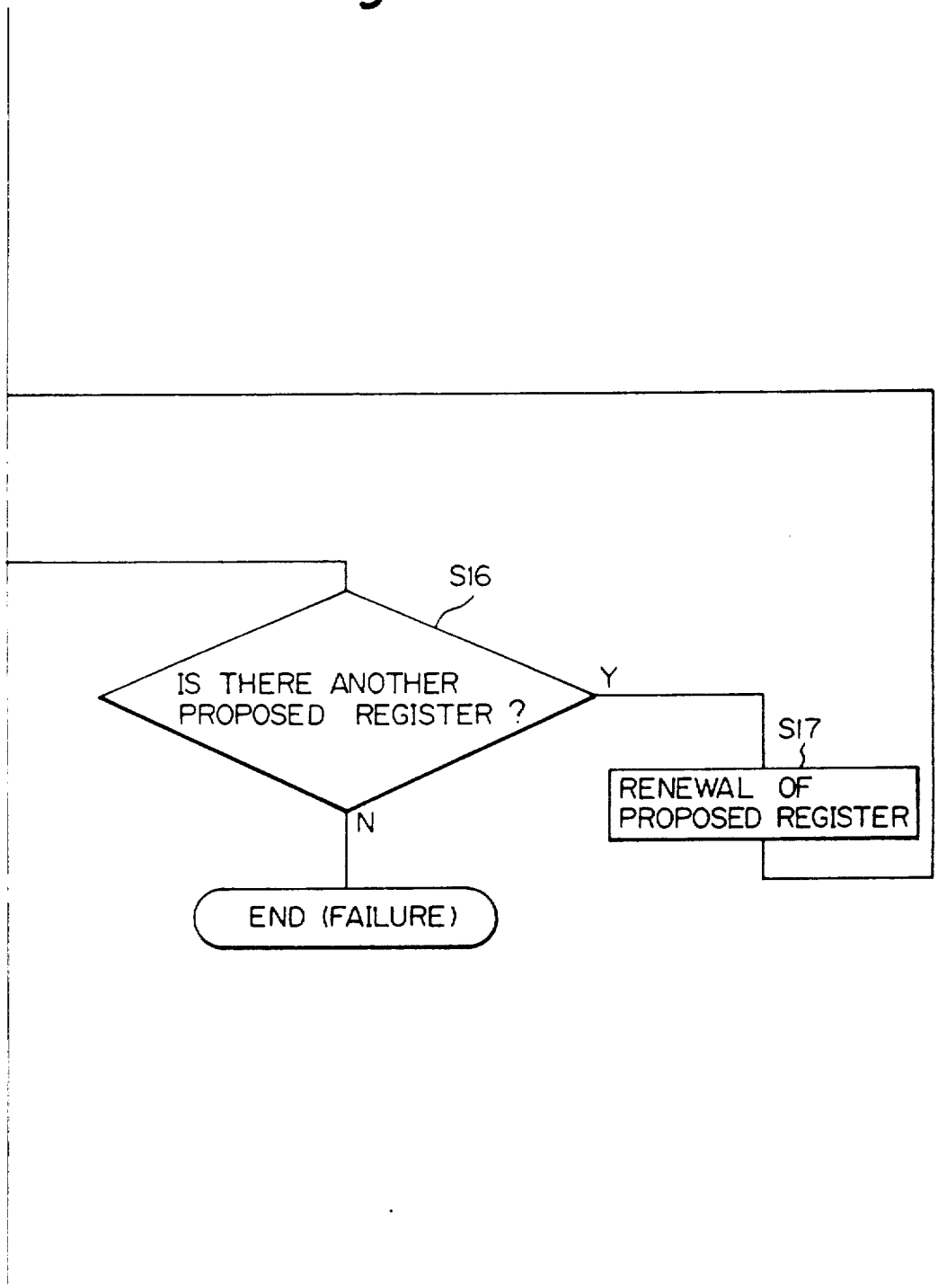

Now, again referring to FIG. 3, upon termination of step S7, that is, processing described in reference to FIGS. 5A and 5B, it is discriminated whether coloring of the respective virtual registers, namely allocation of the real registers, has been completed (step S8). As a result of step S15 in FIG. 5A, if the processing has been terminated, then the result of step S8 becomes YES and the register allocation processing is terminated by converting the pseudo-codes into machine codes, as shown in step S10. The resultant machine codes are then read out from memory 12 and transferred to be stored in disk 10, as shown in FIG. 8. On the other hand, if the processing has been terminated, as a result of step S16 in FIG. 5B, then the result of step S8 becomes NO and the register allocation processing, similar to the conventional one in which is the real registers are saved, is performed (step S9) and then terminated through step S10.

Figure 6A:
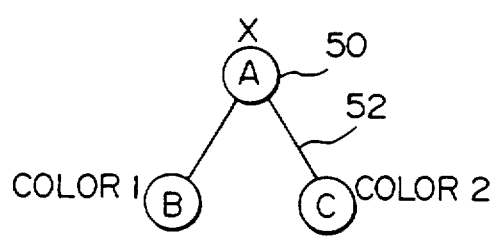
FIGS. 6A and 6B are diagrams used for the explanation related to coloring in the embodiment.
Figure 6B:
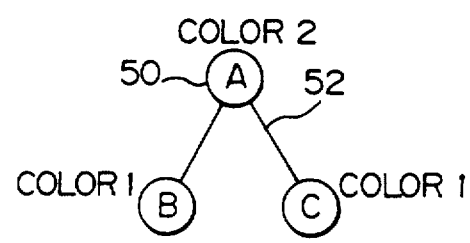

Necessity for discrimination in step S8 will be explained hereinafter. FIGS. 6A and 6B are diagrams used for the explanation related to coloring. First, it is assumed that two real registers are prepared for allocation, and three virtual registers, that is, nodes A, B and C exist in such a relation that nodes A and B interfere, and nodes A and C interfere, namely the respective set of the nodes are coupled with each other by edges.

Under the condition set forth above, let us consider that for instance, as shown in FIG. 6A, coloring of nodes B, C and A is performed in the order named. It is assumed that node B is subjected to coloring with first real register (color 1), and node C is subjected to coloring with second real register (color 2) on a redundant basis. In this case, if it is desired that node A is subjected to coloring, a third register is needed, since it is impossible to provide coloring for node A even with any of colors 1 and 2. In order to solve such a failure in coloring, there is provided step S8.

Further let us consider that as shown in FIG. 6B, coloring of nodes B, C and A is performed in the order named, and node B is subjected to coloring with color 1 and node C is subjected to coloring with color 1 on a saving basis similar to the conventional way. In this case, it is possible to provide coloring for node A with color 2, and thus the coloring is successful.

Now referring to FIG. 1A again, upon performing of allocation of the real registers as mentioned above, three real registers r0, r1 and r2 are allocated to the associated virtual registers, respectively. Provided the optimizing processing is performed for the machine language words under the conditions as shown in FIG. 1A, the machine-oriented words are relocated as shown in FIG. 1B, thereby preventing the disturbances of the pipe.

FIG. 7 is a diagram useful for understanding an arrangement of the real registers. It is assumed only for explanation that there are thirty-two real registers, and they are divided into four blocks in accordance with their use for various purposes. Twenty-nine real registers r0-r28 thereof are permitted to be used as the registers proposed for allocation. The real registers r29-r31 are specific registers and are restricted in their use. In the real registers r0-r28 are further classified into three blocks based on their relative costs. The real registers r4-r15 are expensive, the real registers r0-r3 are of middle cost, and the real registers r16-r28 are cheap. The "costs" relate to the amount of security of values between functions (see Remarks column in FIG. 7) in view of the use.

According to the present invention, the allocation is performed in the order of cheaper real registers, that is, the real registers r16, r17, . . . r28, r3, . . . r0, r4, . . . r15 in the order named.

While the allocation of the real registers is performed in the order as mentioned above, it should be noted that the real register r16 may not be always proposed as a first register every time when the allocation of the real register to the virtual register is performed. For example, there is provided such a modification that at the first time, the real register r16 is proposed for allocation as a first register, the second time, the real register r17, and at the fourth time, the real register r19 are first proposed, respectively, and in fifth time, it returns to the real register r16 and repeated hereafter. This case is called redundancy 4, which is directed to returning after four-time repetition and of course variable.

It is noted that the first time allocation is performed on real registers r16, . . . r28, r3 . . . , the second time allocation, r17, . . . r28, r16, r3, . . . , and the third time allocation, r18, . . . r28, r16, r17, r3, . . . in the order named.

The register allocation system adaptive for pipelining according to the present invention as explained above avoids such a matter that the real registers are allocated to the virtual registers on an extremely saving basis.

This feature makes it possible to expect a high probability of relocation of instructions when an optimizing processing of instruction relocation adaptive for pipelining is performed. Thus, according to the present invention, it is possible to prevent occurrence of the disturbance of the pipe and so on, and thus also to produce an executable format of program which is able to be executed at high speed.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. In a computer implemented compiler, for use in a pipelined parallel processing system having a plurality of real registers, a method for allocating virtual registers associated with sequential instructions of a program to respective real registers of the system, wherein the method comprises:

determining an occupational state for the virtual registers;

performing a live analysis to determine a living period for each of the virtual registers;

determining if the living period of any virtual register overlaps with the living period of any other virtual register indicating an interference;

determining, for each of the respective virtual registers, if the number of interferences exceeds the number of real registers in the system;

if the number of interferences for the virtual register is less than the number of real registers in the system, then eliminating each such virtual register from further interference processing;

if the number of interferences for the virtual register is not less than the number of real registers in the system, then for each such remaining virtual register, reducing the living period of the virtual register by inserting a spill code instructing the saving of the contents of the virtual register to memory, inserting a return instruction, and proceeding to the step of determining an occupational state for the virtual registers to continue the processing with the remaining virtual registers; and when the number of interferences for each virtual register is less than the number of real registers in the system, then allocating the virtual registers to respective real registers, wherein the allocating of the virtual registers to respective real registers comprises:

selecting the virtual register;

selecting a proposed real register;

determining whether allocation of the selected virtual register to the proposed real register is possible;

if allocation of the selected virtual register to the proposed real register is possible, then allocating the virtual register to the proposed real register;

if allocation of the selected virtual register to the proposed real register is not possible, then selecting another real register as the proposed real register and returning to the step of determining whether allocation of the selected virtual register to the proposed real register is possible;

determining if there are any more virtual registers unallocated;

if there are any more virtual registers unallocated, then returning to the step of selecting the virtual register and repeating the allocating of virtual registers to respective real registers until completed.

2. The method for allocating virtual registers associated with sequential instructions of a program to respective real registers of the system according to claim 1, further comprising relocating the plurality of instructions in the program to form a new instruction sequence optimized for parallel pipelined execution based on the allocation of registers.

3. A system for allocating virtual registers to respective real registers, the virtual registers being associated with sequential instructions of a program to be executed in a pipelined parallel processing system having a plurality of real registers, the system comprising:

means for determining an occupational state for the virtual registers;

means for performing a live analysis to determine a living period for each of the virtual registers;

means for determining if the living period of any virtual register overlaps with the living period of any other virtual register indicating an interference;

means for determining, for each of the respective virtual registers, if the number of interferences exceeds the number of real registers in the system;

means for eliminating the virtual register from further interference processing, if the number of interferences for the virtual register is less than the number of real registers in the system;

means for reducing the living period of the virtual register by inserting a spill code instructing the saving of the contents of the virtual register to memory, inserting a return instruction, if the number of interferences for the virtual register is not less than the number of real registers in the system; and means for allocating the virtual registers to respective real registers when the number of interferences for each virtual register is less than the number of real registers in the system, wherein the means for allocating of the virtual registers to respective real registers comprises:

means for selecting the virtual register;

means for selecting a proposed real register;

means for determining whether allocation of the selected virtual register to the proposed real register is possible;

means for allocating the virtual register to the proposed real register, if allocation of the selected virtual register to the proposed real register is possible;

means for selecting another real register as the proposed real register, if allocation of the selected virtual register to the proposed real register is not possible;

means for determining if there are any more virtual registers unallocated, wherein allocating of virtual registers to respective real registers continues until all virtual registers are allocated.

* * * * *